(12) United States Patent
Carpino et al.

(10) Patent No.: US 10,919,750 B2
(45) Date of Patent: Feb. 16, 2021

(54) ROTARY FILLING MACHINE

(71) Applicant: PACIFIC PACKAGING MACHINERY, LLC, Corona, CA (US)

(72) Inventors: Gerald A. Carpino, San Clemente, CA (US); Peter T. Carpino, Ladera Ranch, CA (US)

(73) Assignee: PACIFIC PACKAGING MACHINERY, LLC, Corona, CA (US)

(*) Notice: Subject to any disclaimer, the term of this patent is extended or adjusted under 35 U.S.C. 154(b) by 103 days.

(21) Appl. No.: 15/985,051

(22) Filed: May 21, 2018

(65) Prior Publication Data

US 2018/0346306 A1 Dec. 6, 2018

Related U.S. Application Data

(60) Provisional application No. 62/515,653, filed on Jun. 6, 2017.

(51) Int. Cl.
*F16K 11/085* (2006.01)
*B67C 3/22* (2006.01)
(Continued)

(52) U.S. Cl.
CPC ............ *B67C 3/225* (2013.01); *B65B 3/12* (2013.01); *B65B 39/003* (2013.01);
(Continued)

(58) Field of Classification Search
CPC .......... B67C 3/225; B67C 3/281; B67C 3/26; B67C 3/2637; B65B 39/003; B65B 39/145; B65B 43/50; B65B 2039/009; Y10T 137/2652; Y10T 137/86558; Y10T 137/86871; Y10T 137/86863; Y10T 137/87909; F16K 5/0421; F16K 11/085; F16K 11/0853; F16K 31/58; B65D 47/263; B65D 47/265; B65D 47/268; B67D 1/0082; B67D 1/1444
(Continued)

(56) References Cited

U.S. PATENT DOCUMENTS 2,893,605 A * 7/1959 Anderson ................. B65B 3/30
  222/145.3
3,055,404 A * 9/1962 Anderson ............... F16K 31/58
  141/144
(Continued)

FOREIGN PATENT DOCUMENTS

DE 102013102594 9/2014
GB 341129 1/1931
(Continued)

*Primary Examiner* — Matthew W Jellett
(74) *Attorney, Agent, or Firm* — Thompson Hine LLP

(57) ABSTRACT

A rotary filling machine includes a hub member and a hub insert. The hub member includes an internal bore defining an inner surface portion with a plurality of material transfer openings. The hub insert includes a portion disposed within the bore, wherein the portion includes an outer surface portion that includes a plurality of material transfer openings. One of the hub member or the hub insert is rotatable and the other of the hub member or the hub insert is stationary.

18 Claims, 15 Drawing Sheets

(51) Int. Cl.
  *B65B 3/12* (2006.01)
  *B67C 3/28* (2006.01)
  *B65B 43/50* (2006.01)
  *B65B 39/00* (2006.01)
  *B65B 39/14* (2006.01)
  *F16K 5/04* (2006.01)
  *B65D 47/26* (2006.01)
  *F16K 31/58* (2006.01)
  *B67D 1/00* (2006.01)
  *B67D 1/14* (2006.01)

(52) U.S. Cl.
  CPC ............ *B65B 39/145* (2013.01); *B65B 43/50* (2013.01); *B65D 47/263* (2013.01); *B65D 47/265* (2013.01); *B65D 47/268* (2013.01); *B67C 3/22* (2013.01); *B67C 3/281* (2013.01); *B67D 1/0082* (2013.01); *B67D 1/1444* (2013.01); *F16K 5/0421* (2013.01); *F16K 11/085* (2013.01); *F16K 11/0853* (2013.01); *F16K 31/58* (2013.01); *B65B 2039/009* (2013.01); *Y10T 137/2652* (2015.04); *Y10T 137/86558* (2015.04); *Y10T 137/86863* (2015.04); *Y10T 137/86871* (2015.04); *Y10T 137/87909* (2015.04)

(58) Field of Classification Search
  USPC ........ 137/118.02, 616.7, 617.7, 625, 625.15, 137/625.16, 862, 874, 876, 905; 141/144, 141/244; 222/485, 486; 239/449; 251/345
  See application file for complete search history.

(56) References Cited

U.S. PATENT DOCUMENTS

| | | | | |
|---|---|---|---|---|
| 3,127,909 A | * | 4/1964 | Alamprese | F16K 5/0421 |
| | | | | 137/625.31 |
| 3,166,107 A | * | 1/1965 | Swenson | B65B 39/145 |
| | | | | 141/145 |
| 3,190,584 A | * | 6/1965 | Gire | B64C 29/0091 |
| | | | | 244/52 |
| 4,024,896 A | | 5/1977 | Ishioka | |
| 4,522,238 A | | 6/1985 | Minard | |
| 5,881,770 A | * | 3/1999 | Neill | F16K 11/0743 |
| | | | | 137/625.11 |
| 6,026,867 A | | 2/2000 | Klarl | |
| 6,079,460 A | | 6/2000 | Ballan | |
| 6,192,947 B1 | | 2/2001 | Ballan | |
| 6,230,607 B1 | * | 5/2001 | Rehrl | A61C 1/0038 |
| | | | | 251/208 |
| 7,299,832 B2 | | 11/2007 | Hartness | |
| 7,984,730 B2 | * | 7/2011 | Ziv | A61M 39/223 |
| | | | | 137/625.46 |
| 8,096,330 B2 | | 1/2012 | Mazzon | |
| 8,991,442 B1 | | 3/2015 | Navin | |
| 9,567,123 B2 | | 2/2017 | Mengibar | |
| 9,708,168 B2 | * | 7/2017 | Knieling | B67C 3/22 |
| 2018/0100594 A1 | * | 4/2018 | Roseman | F16K 11/0712 |

FOREIGN PATENT DOCUMENTS

| | | |
|---|---|---|
| GB | 557590 | 11/1943 |
| WO | WO 2012/150513 | 11/2012 |

* cited by examiner

US 10,919,750 B2

ROTARY FILLING MACHINE

TECHNICAL FIELD

This application relates generally to filling machines, more specifically, to a rotary filling machine such as those used for filling bottles, cans or other containers with liquids or other flowable materials.

BACKGROUND

Rotary manifold filling machines commonly utilize a stationary flow divider plate atop a rotating filling head plate, with a bottom planar surface of the flow divider plate engaging an upper planar surface of the filling head plate. The flow divider plate includes multiple fill zone openings or recesses at the bottom surface and the filling head plate includes multiple fill ports at the upper surface. As the filling head plate rotates, the fill ports move sequentially into and out of alignment with the fill zone openings as containers are filled. Each fill port leads to a fill nozzle that aligns with the container opening for filling, with the container, nozzle and filling head plate rotating in a synchronous manner during fill. The plate against plate rotary filling arrangement can be difficult to seal effectively, and is also difficult to clean.

It would be desirable to provide a rotary filling machine capable of more effective sealing and/or reduced cleaning and maintenance.

SUMMARY

In one aspect, a rotary filling machine includes a hub member and a hub insert. The hub member includes an internal bore defining an inner surface portion with a plurality of material transfer openings. The hub insert includes a portion disposed within the bore, wherein the portion includes an outer surface portion that includes a plurality of material transfer openings. One of the hub member or the hub insert is rotatable and the other of the hub member or the hub insert is stationary.

In another aspect, a rotary filling machine includes a hub member including a first end a second end and an internal bore extending from the first end toward the second end, the internal bore defining an inner surface portion with a plurality of material transfer openings. A hub insert has a first end and a second end, at least part of the hub insert disposed within the bore, wherein the part of the hub insert includes an external sidewall defining an outer surface portion that includes a plurality of material transfer openings. One of the hub member or the hub insert is rotatable and the other of the hub member or the hub insert is stationary. The inner surface portion and the outer surface portion are in an axially aligned and mating relationship such that rotation of the one of the hub member or the hub insert causes a relative sequential movement in and out of fluid transfer alignment as between each of the material transfer openings of the hub member and each of the material transfer openings of the hub insert.

In a typical machine of the foregoing type, a plurality of filling nozzles, wherein each material transfer opening of the one of the hub member or the hub insert feeds material to a respective one of the filling nozzles, wherein the filling nozzles rotate with the one of the hub member or hub insert.

DETAILED DESCRIPTION

Figure 1:
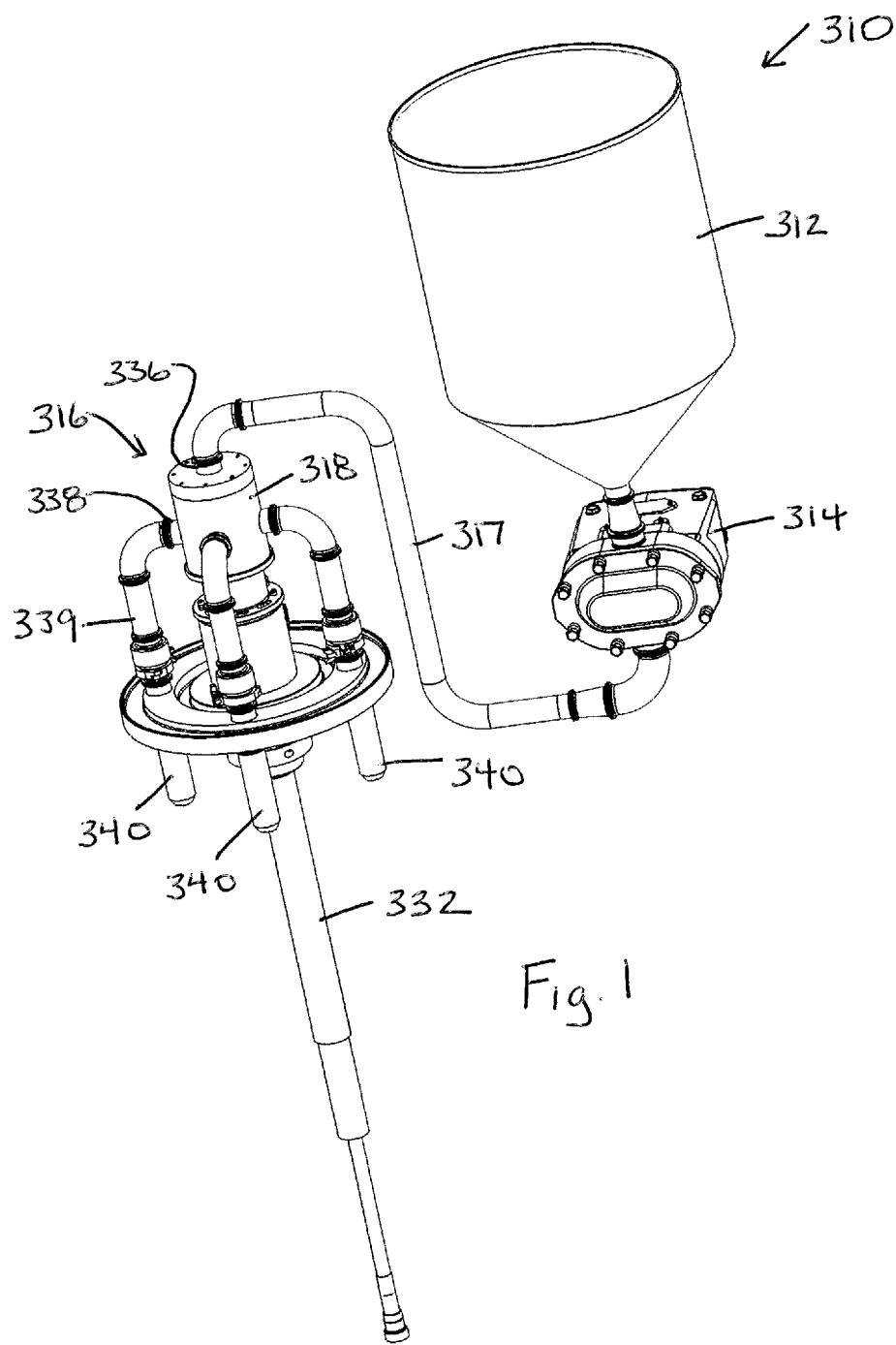
FIG. 1 is a partial perspective depiction of a rotary filling machine.
Figure 2:
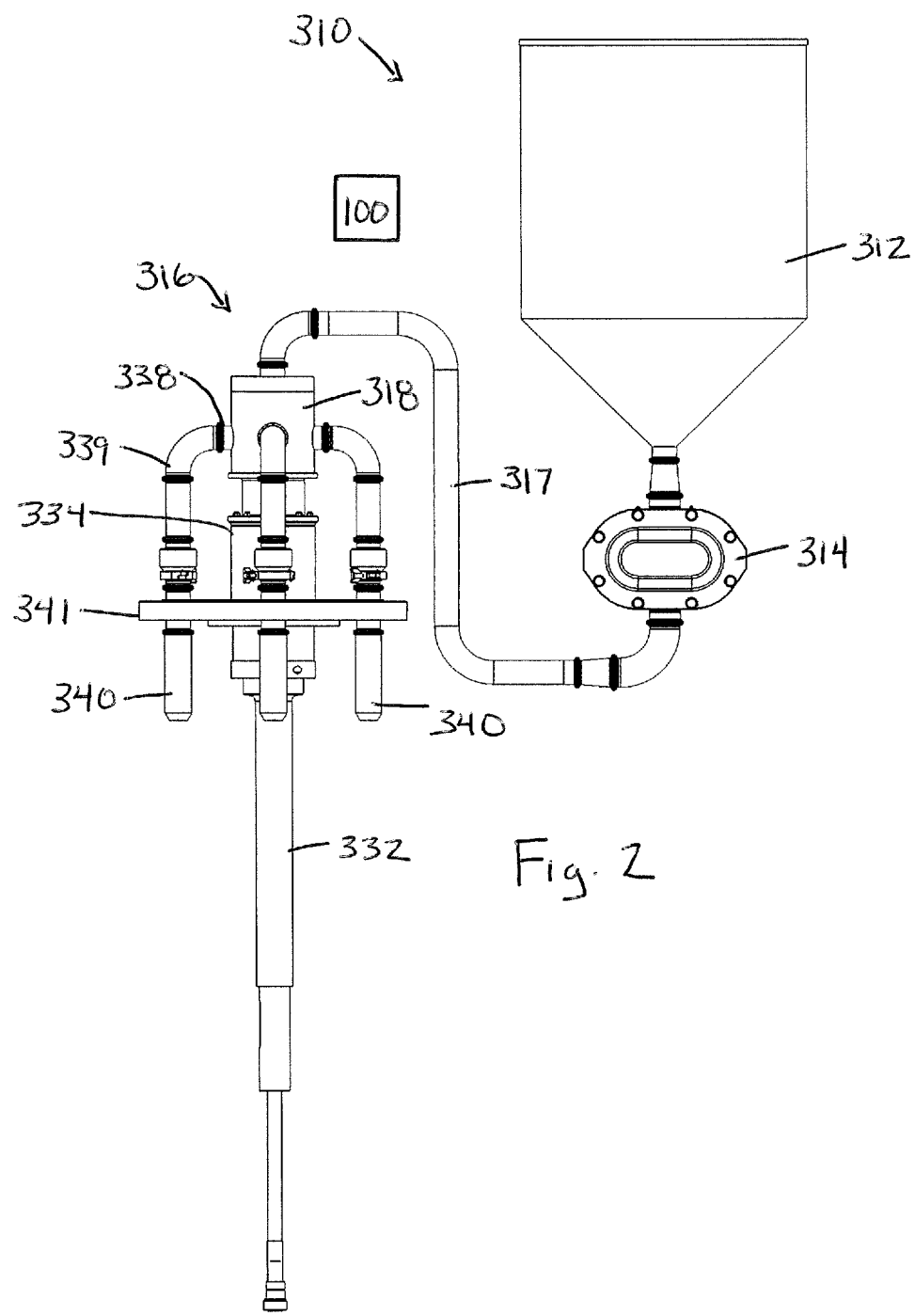
FIG. 2 is a side elevation of the rotary filling machine.
Figure 3A:
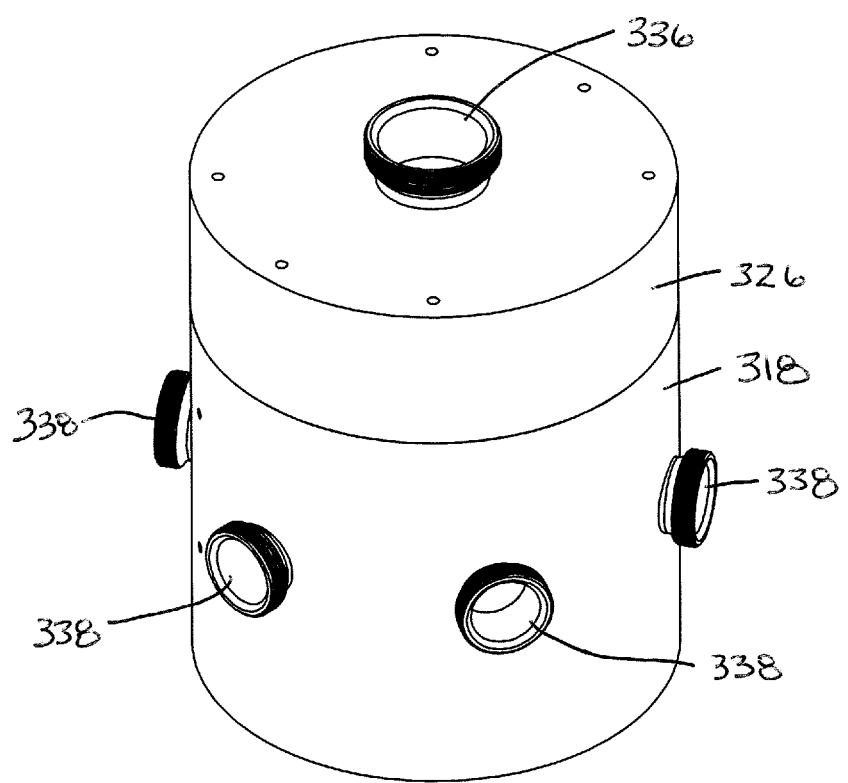
FIG. 3A shows a perspective view of a hub and hub insert of the rotary filling machine.
Figure 3B:
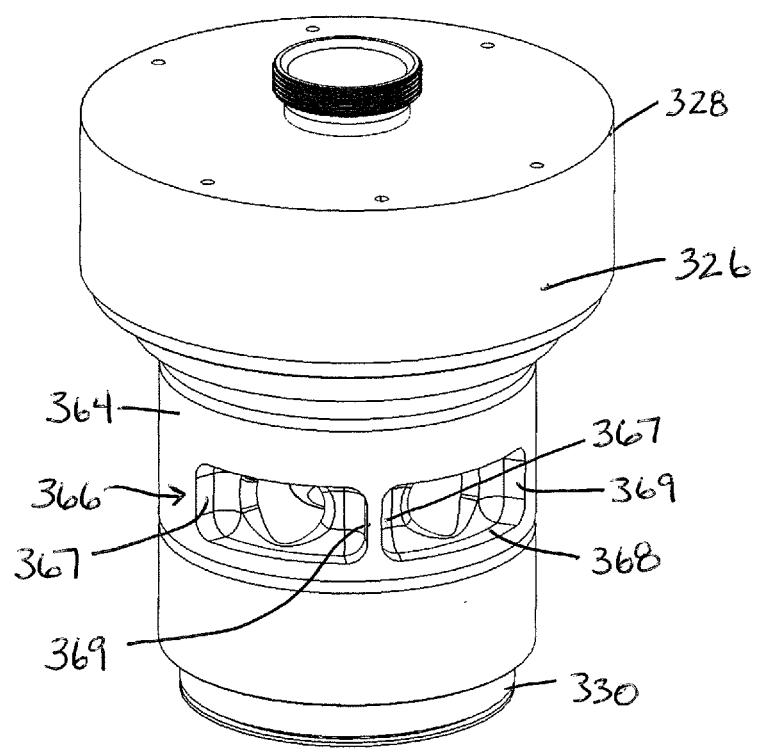
FIG. 3B shows a perspective view of the hub insert.
Figure 3C:
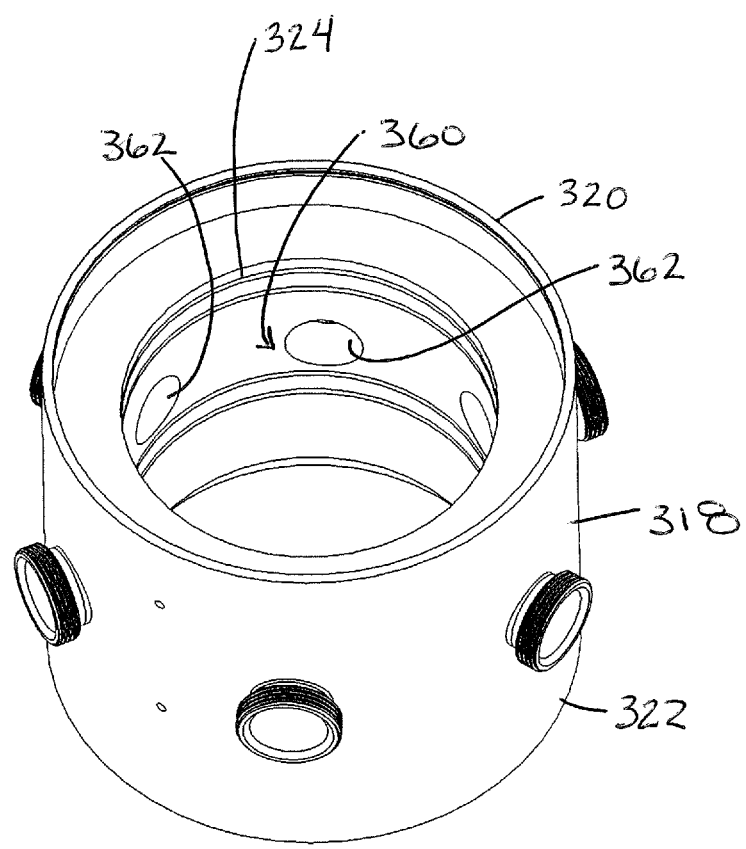
FIG. 3C shows a perspective view of the hub.
Figure 4:
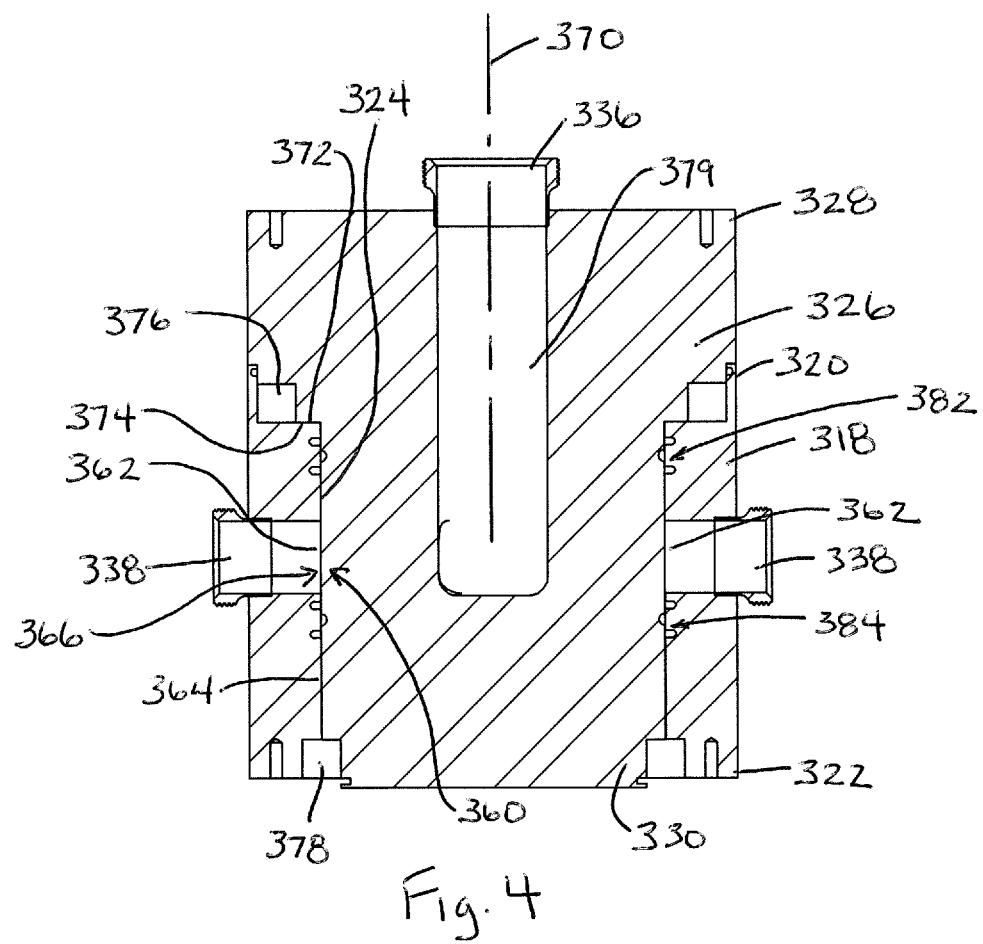
FIG. 4 shows one cross-section of the hub and hub insert along a vertical plane.

One embodiment of a rotary filling machine 310 is shown in FIGS. 1 and 2 and includes a product tank 312 that holds liquid or other flowable material and a pump 314 for feeding the flowable material to the filling assembly 316 along flow path 317. The filling assembly includes a hub member 318 and hub insert 326, details of which are shown in FIGS. 3A-3C and 4-5. The hub member includes an upper end 320 a lower end 322 and an internal bore 324 extending from the upper end toward the lower end. The hub insert 326 has an upper end 328 and lower end 330, and at least part of the hub insert (e.g., here the lower part) is disposed within the bore 324. The hub member 318 is rotatable (e.g., via a shaft 332 and coupling 334) and the hub insert 326 is stationary. As the hub member 318 rotates, flowable material is pumped to an inlet 336 of the hub insert 326 and is sequentially delivered to feed outlets 338 of the hub member, which in turn are connected by flow paths 339 to provide flow to respective filling nozzles 340, which also rotate with the hub member 318, as does filling nozzle stabilizing plate 341. The filling nozzles 340 have lower outlet openings to deliver the flowable material into respective containers (not shown). Typically, the containers also rotate synchronously with the hub member 318 during filling by way of a container transport system. In some cases, the container transport system includes container supports/holders that raise and lower the containers relative to the lower output ends of the nozzles 340 during filling operations to achieve a bottom up fill of the containers. In other cases, the lower ends of the filling nozzles 340 may simply be positioned at the top opening of the containers for filling, in which case the containers need not be raised and lowered during actual filling.

FIGS. 3A-3C and 4-5 show a detailed embodiment of the hub member 318 and hub insert 326. The hub insert 326 includes one material inlet 336 and the hub member 318 includes six feed outlets 338. Here, the material inlet 336 and the feed outlets are defined in part by bevel seat threaded fittings. It is recognized that the number and size of the inlets and outlets could vary.

The internal bore 324 of the hub member defines an inner surface portion 360 with multiple (here six) material transfer openings 362, one for each feed outlet 338. The hub insert 326 includes an external sidewall 364 defining an outer surface portion 366 that includes multiple (here two) material transfer openings 368. The material inlet 336 feeds both of the transfer openings 368 via a vertically extending main flow passage 379 that connects with two lateral flow passages 380, where each lateral flow passage runs to a respective one of the transfer openings 368. Notably, the transfer openings 368 widen circumferentially to form transfer pockets that have an entry edge 367 and exit edge 369 that is substantially vertically oriented, where each opening/pocket 368 is identical in shape and size to the other. Each of the material transfer openings 362 is of identical shape and size to the other material transfer openings 362.

The inner surface portion 360 and the outer surface portion 366 are in an axially aligned (e.g., along a vertical axis 370) and mating (e.g., with surface portions 360 and 366 in close proximity) relationship such that rotation of the hub member 326 causes a relative sequential movement in and out of fluid transfer alignment as between each of the hub member material transfer openings 368 and each of the hub insert material transfer openings 362. Here, both surface portions 360 and 366 are configured to define right circular cylinders, which run parallel to the rotational axis 370, but variations are possible.

The bore 324 defines an annular shoulder 372 and the upper portion of the hub insert 326 includes an enlarged diameter to define a downwardly facing annular surface 374 that sits on the shoulder 372. This arrangement helps to define the proper axial position of the hub insert relative to the hub member. An upper bearing channel 376 and a lower bearing channel 378 may be provided for ease of relative rotation of the hub member relative to the hub insert.

Figure 5:
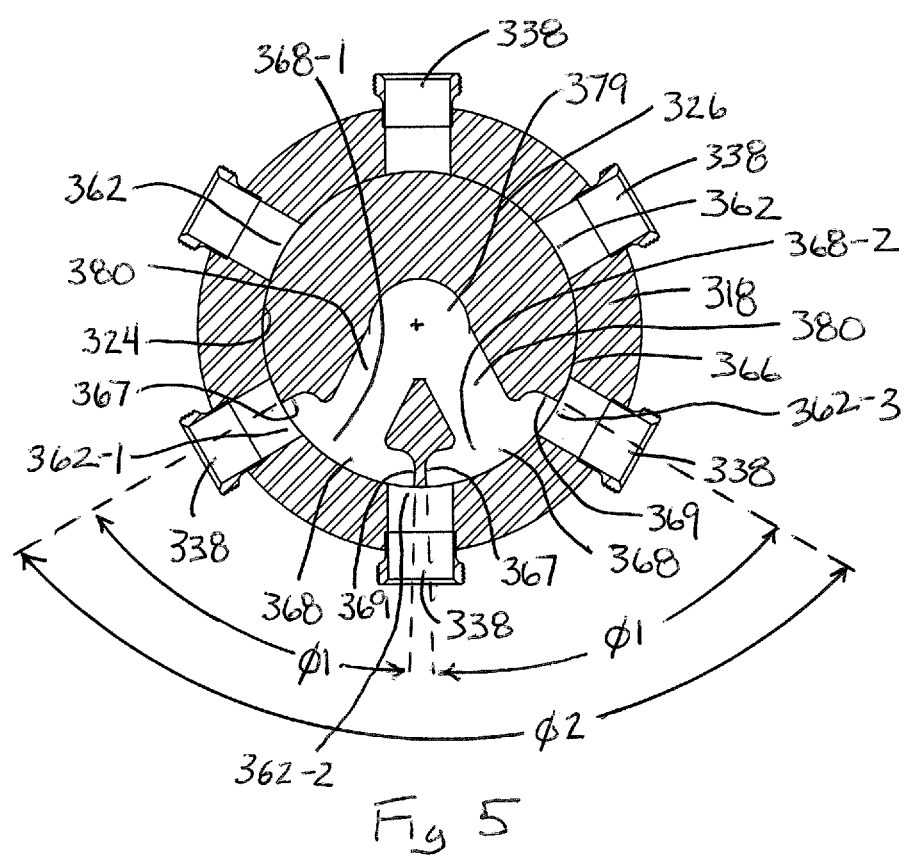
FIG. 5 shows another cross-section of the hub and hub insert along a horizontal plane.
Figure 6:
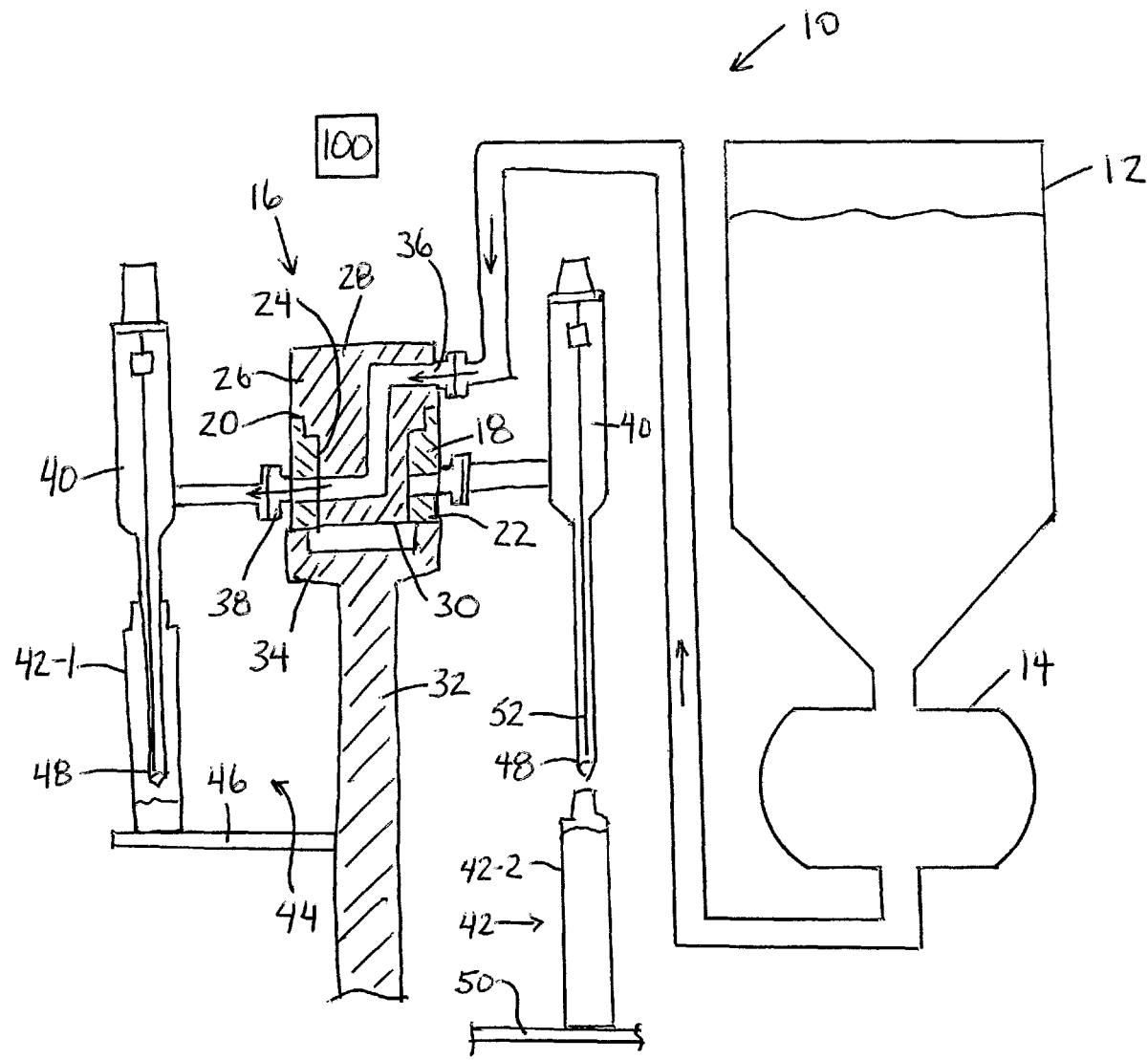
FIG. 6 shows a schematic depiction of another embodiment of a rotary filling machine.
Figure 7:
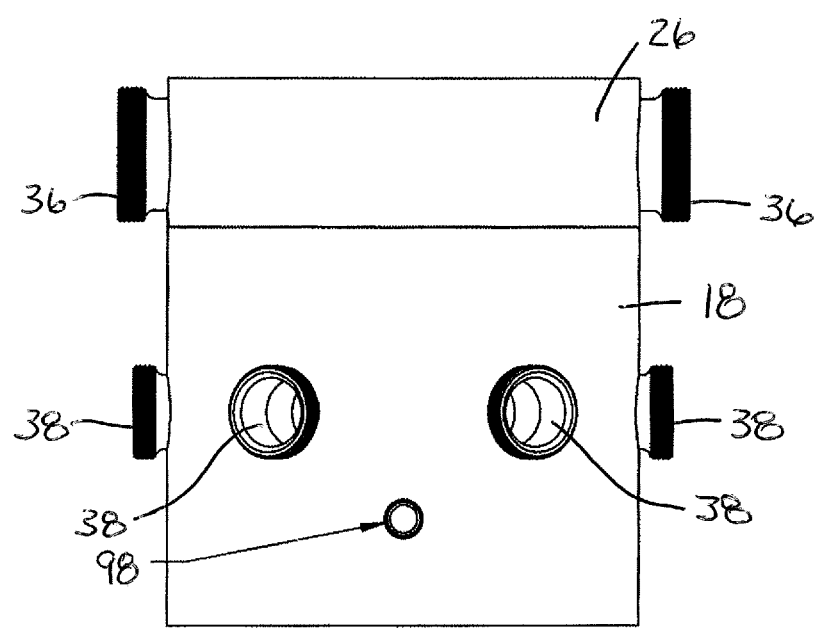
FIG. 7 shows a side elevation of a hub and hub insert of the rotary filling machine of FIG. 6.
Figure 8:
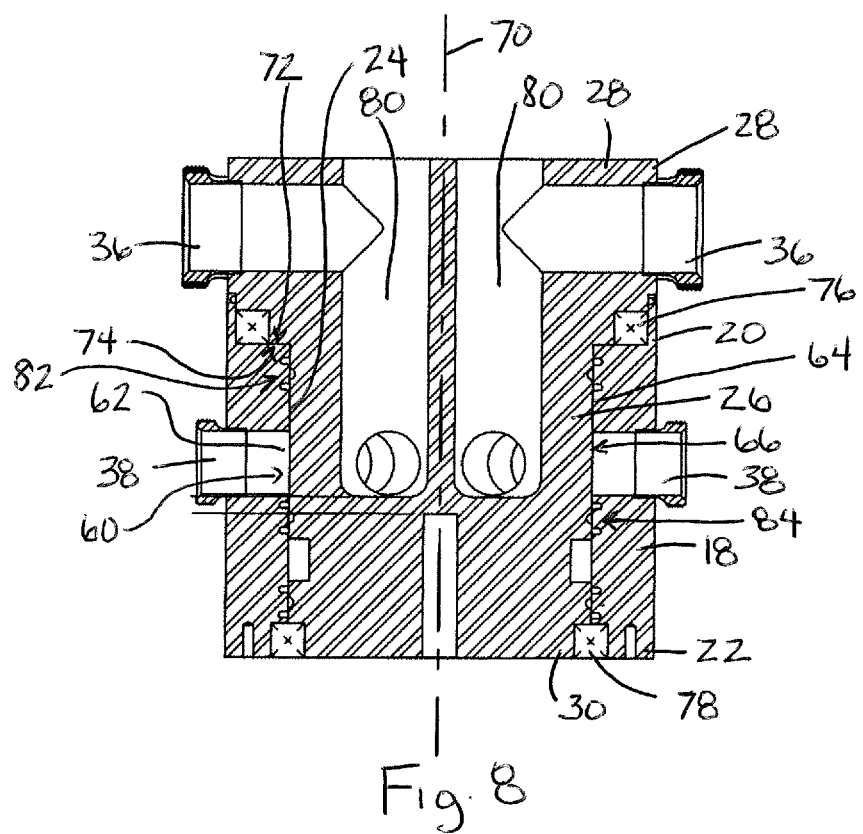
FIG. 8 shows one cross-section of the hub and hub insert of FIG. 7 along one vertical plane.
Figure 9:
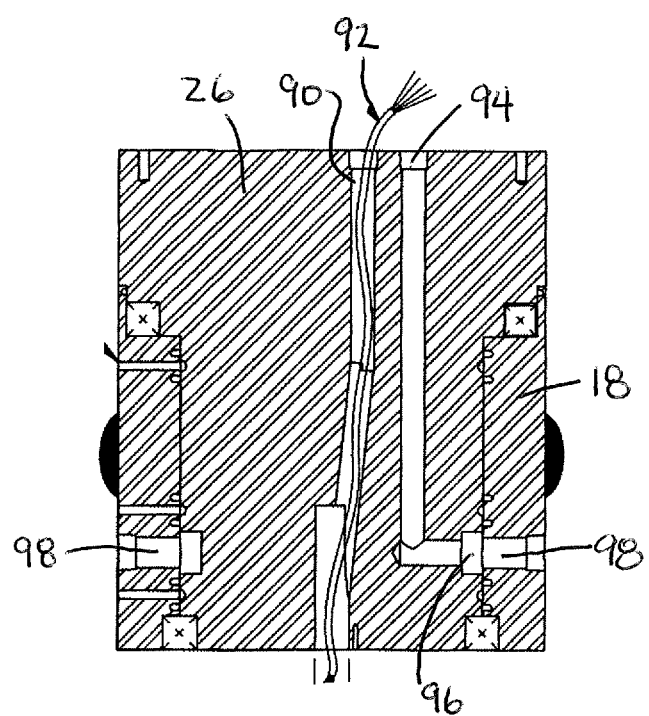
FIG. 9 shows another cross-section of the hub and hub insert of FIG. 7 along another vertical plane.
Figure 10:
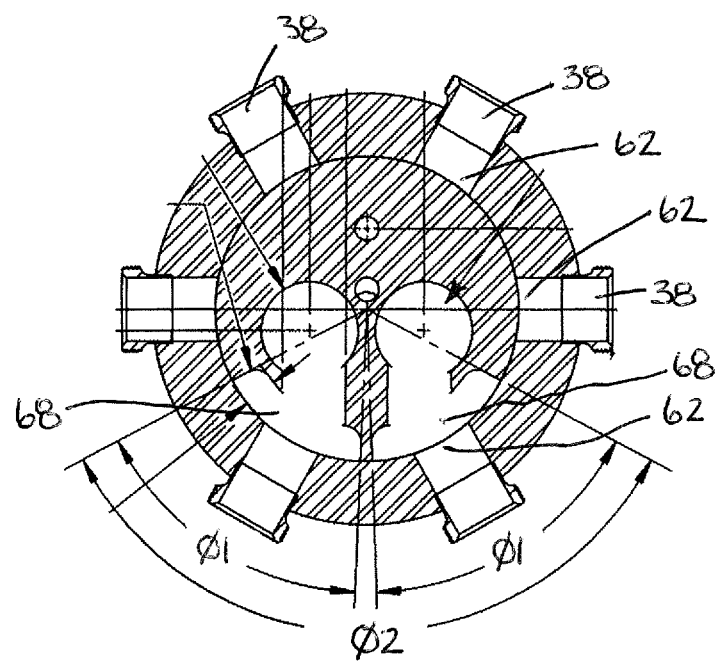
FIG. 10 shows another cross-section of the hub and hub insert of FIG. 7 along a horizontal plane.

As seen in FIG. 5, a circumferential extent φ1 of each of the openings 368 is defined by entry and exit edges 367 and 369 of the opening, and the circumferential extent φ1 is larger than the circumferential angular extent of each of the openings 362. The six openings 362 are circumferentially spaced uniformly so that the angle between the circumferential center of one opening 362 to the next is defined by (360°)/(# of openings 362), which here is 360°/6 or sixty degrees. The circumferential angular extent φ1 is set to match the center-to-center circumferential angular spacing of the openings 362, and a slight angular offset between the openings 368 is provided (e.g., five degrees or less, such as on the order of about one to three degrees). As a result, the circumferential length or angular extent φ2 of outer surface portion 366 that includes the openings 368. which extent defines the angular fill zone or circumferential fill zone range of the assembly, is slightly greater than the sum of the circumferential extents φ1 of the openings 368.

One or more upper annular seal members 382 and one or more lower annular seal members 384 are located between the inner surface portion 360 and the outer surface portion 366 at respective locations above and below the zone of vertical alignment between the hub member material transfer openings 362 and the hub insert material transfer openings 368. In one embodiment, the seal members 382 and 384 may be formed as spring seals that sit at least partially within circumscribing recesses of the wall of the axial bore 324. However, other types of annular seals could be used, and the circumscribing recesses could be formed on the outer surface of the hub insert wall.

In operation, as the hub 318 rotates, each hub member material transfer opening 362 moves sequentially past both hub insert material transfer openings 368 for the purpose of filling a container. Notably, based upon the common shape and size of the transfer openings 368, the common shape and size of the transfer openings 362 and the sizing of the circumferential extent φ1 of each transfer opening 368 to match the circumferential spacing between the transfer openings 362, a uniformity and consistency of material flow in the system is achieved. In particular, based upon the dimensions, spacing and shapes of the respective transfer openings 362 and 368, each transfer opening/pocket 368 is at all times aligned with the same total flow area of transfer opening(s) 362, whether that total flow area is made up of a single transfer opening 362 or parts of two transfer openings 362. This feature can be seen well in FIG. 5, where a counterclockwise rotation of the hub member 318 is assumed for the following discussion. Here, the material transfer opening 368-1 on the left side of the cross-section is aligned with both a leading part of material transfer opening 362-1 and a trailing part of material transfer opening 362-2, with the total flow area of the parts of the material transfer openings 362-1 and 362-2 aligned with pocket 368-1 matching the total flow area of a single transfer opening 362. Likewise, the material transfer opening 368-2 on the right side of the cross-section is aligned with a leading part of material transfer opening 362-2 and a trailing part of material transfer opening 362-3, where the total flow area of the parts of the material transfer openings 362-2 and 362-3 that are aligned with the pocket 368-2 matches the total flow area of a single transfer opening 362. Thus, the material transfer openings 368 and the material transfer openings 362 are collectively sized, positioned and shaped so that the size of the flow area of the transfer openings 362 that is aligned with each transfer opening 368 is always substantially the same. That is, a hub member material transfer opening flow area that is aligned with each material transfer opening of the hub insert is always substantially the same and, here, is always substantially equal to a flow area defined by an inlet configuration of a single material transfer opening 362 of the hub member. In the subject configuration, each stator pocket never sees two full rotor openings at the same time.

In the above embodiment of the rotary filling machine, the filling nozzles 340 do not include any flow control independent of operation of the pump 314 and alignment or non-alignment of each material transfer opening 362 with the material transfer openings 368. This arrangement is most often used for more viscous flowable materials. However, in other embodiments the filling nozzles could be formed at the lower ends of filling heads that provide the ability for independent control of the open or closed state of the filling nozzle outlet opening, which is useful for less viscous materials.

In this regard, reference is now made to FIGS. 6-10 showing another embodiment of a rotary filling machine 10 that includes a product tank 12 that holds liquid or other flowable material and a pump 14 for feeding the flowable material to the filling assembly 16. The filling arrangement includes a hub member 18 including an upper end 20 a lower end 22 and an internal bore 24 extending from the upper end toward the lower end. A hub insert 26 has an upper end 28 and lower end 30, and at least part of the hub insert (e.g., here the lower part) is disposed within the bore 24. The hub member is rotatable (e.g., via a shaft 32 and coupling 34) and the hub insert is stationary. As the hub member 18 rotates, flowable material is pumped to one or more inlets 36 of the hub insert 26 and is delivered to feed outlets 38 of the hub member, which in turn are connected to provide flow to filling heads 40, which also rotate with the hub member 18. The filling heads deliver the flowable material into respective containers 42 (e.g., here bottles) by nozzle portions 48.

The containers 42 also rotate synchronously with the hub member 18 during filling by way of a container transport system 44 that may include container supports/holders 46 that raise and lower the containers 42 relative to the lower output ends of the nozzles 48 during filling operations to achieve a bottom up fill of the containers 42. Here, container 42-1 shows a container at an initial stage of fill on a raised support 46 and container 42-2 shows a container after filling is completed and the container 42-2 has been lowered and transferred to a take-away conveyance mechanism 50. The nozzles 48 may include internal closing mechanisms 52 that are moved to seal the nozzle opening once filling is completed in order to avoid drips.

FIGS. 7-10 show a detailed embodiment of the hub member 18 and hub insert 26. The hub insert 26 includes two material inlets 36 and the hub member 18 includes six feed outlets 38. Here, both the material inlets and the feed outlets are defined in part by bevel seat threaded fittings (e.g., in the case of inlets 36, two 3 inch diameter fittings, and in the case of outlets 38, six 2 inch diameter fittings). However, it is recognized that the number and size of the inlets and outlets could vary.

The internal bore 24 of the hub member defines an inner surface portion 60 with multiple (here six) material transfer openings 62, one for each feed outlet 38. The hub insert 26 includes an external sidewall 64 defining an outer surface portion 66 that includes multiple (here two) material transfer openings 68. Here, each material inlet 36 feeds a respective one of the transfer openings 68 via respective flow passages 80. However, it is recognized that variations are possible, such as a single inlet 36 connected to an initial passage that splits to form both flow passages 80.

The inner surface portion 60 and the outer surface portion 66 are in an axially aligned (e.g., along the vertical axis 70) and mating (e.g., with surface portions 60 and 66 in close proximity, such as sliding contact) relationship such that rotation of the hub member 26 causes a relative sequential movement in and out of fluid transfer alignment as between each of the hub member material transfer openings 62 and each of the hub insert material transfer openings 68. Here, both surface portions 60 and 66 are configured to define right circular cylinders, but variations are possible. The bore 24 defines an annular shoulder 72 and the upper portion of the hub insert 26 includes an enlarged diameter to define a downwardly facing annular surface 74 that sits on the shoulder 72. This arrangement helps to define the proper axial position of the hub insert relative to the hub member. Upper and lower bearing arrangements 76 and 78 may be provided for ease of relative rotation of the hub member relative to the hub insert.

The circumferential extents φ1 of each of the opening 68 and overall circumferential extent φ2 are the same as described above with respect to FIG. 5. One or more upper annular seal members 82 and one or more lower annular seal members 84 are also provided.

The hub insert 26 is also provided with a through passage 90 from top to bottom that facilitates feeding electrical wiring 92 through the insert. Electrical wiring 92 may be for the purpose of controlling variable flow valves (not shown) along each of the flow passages 80 so that the flow of material can be controlled as desired. The wiring may also be used to control the filling heads. Moreover, the hub insert may include an air inlet port 94 that feeds to an annular recess 96 that is axially aligned with ports 98 of the hub member for the purpose of controlling the opening and closing of the filling heads via air pressure.

In the case of both of the above embodiments, a controller 100 (FIGS. 2 and 6) may be provided for assuring synchronous and appropriate operation of the various components of the filling machine. In this regard, as used herein, the term controller is intended to broadly encompass any circuit (e.g., solid state, application specific integrated circuit (ASIC), an electronic circuit, a combinational logic circuit, a field programmable gate array (FPGA)), processor(s) (e.g., shared, dedicated, or group—including hardware or software that executes code), software, firmware and/or other components, or a combination of some or all of the above, that carries out the control functions of the filling machine or the control functions of any component thereof.

The subject rotary filling system, utilizing a hub member with a hub insert, provides advantages over the prior art plate type arrangements. In particular, less maintenance is required, sealing is improved, and cleanability is enhanced (including the ability to clean in place without disassembly).

It is to be clearly understood that the above description is intended by way of illustration and example only, is not intended to be taken by way of limitation, and that other changes and modifications are possible.

Figure 11:
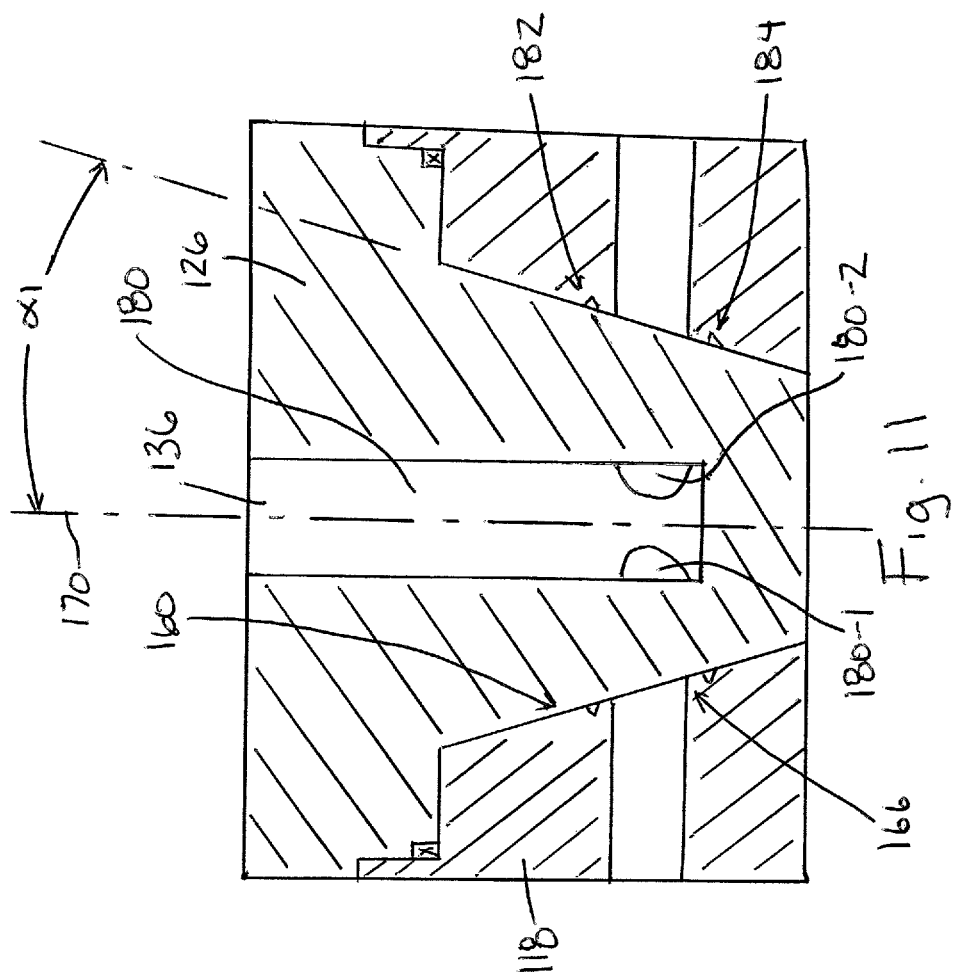
FIG. 11 is a cross-section view of another embodiment of a hub member and hub insert assembly.

For example, while the above embodiments include inner surface portions 60, 360 and outer surface portion 66, 366 of right circular cylinder configuration, other surface portion configurations are possible, provided such surface portions readily mate while at the same time permitting relative rotation. In this regard, FIG. 11 shows an embodiment in which the inner mating surface portion 160 of the hub member 118 and the outer mating surface portion 166 of the hub insert 126 are both tapered to provide frustoconical configurations, which preferably have an angle of inclination al that is offset from the vertical center and rotational axis 170 by no more than 25°, such as no more than 20°, such as no more than 15°). A single top inlet 136 feeds material along a main passage 180 that splits to two passages 180-1 and 180-2 for feeding two material transfer openings (not shown) of the hub insert 126. Annular seal members 182 and 184 are also shown.

Figure 12:
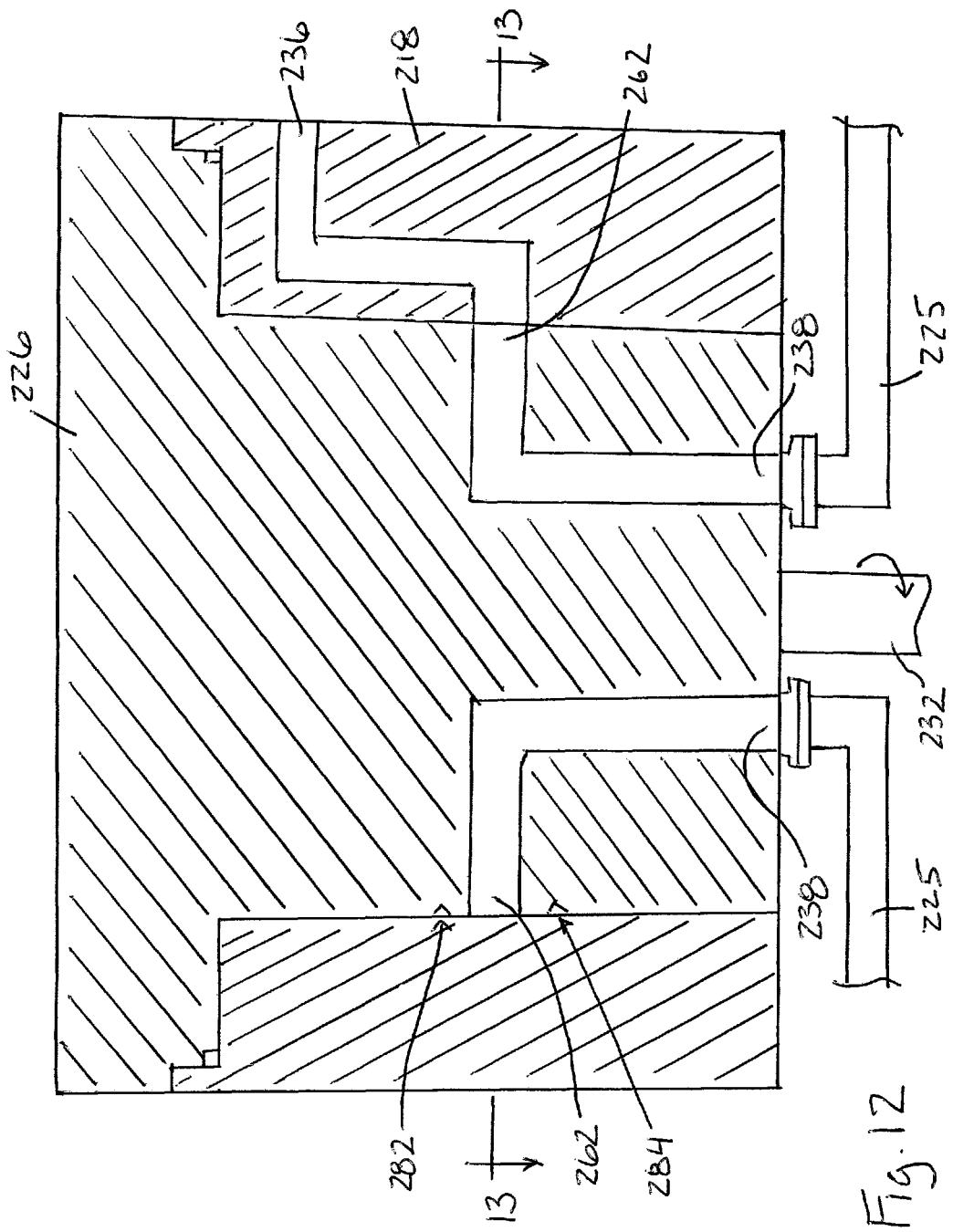
FIGS. 12 and 13 are cross-section views of another embodiment of a hub member and hub insert assembly.
Figure 13:
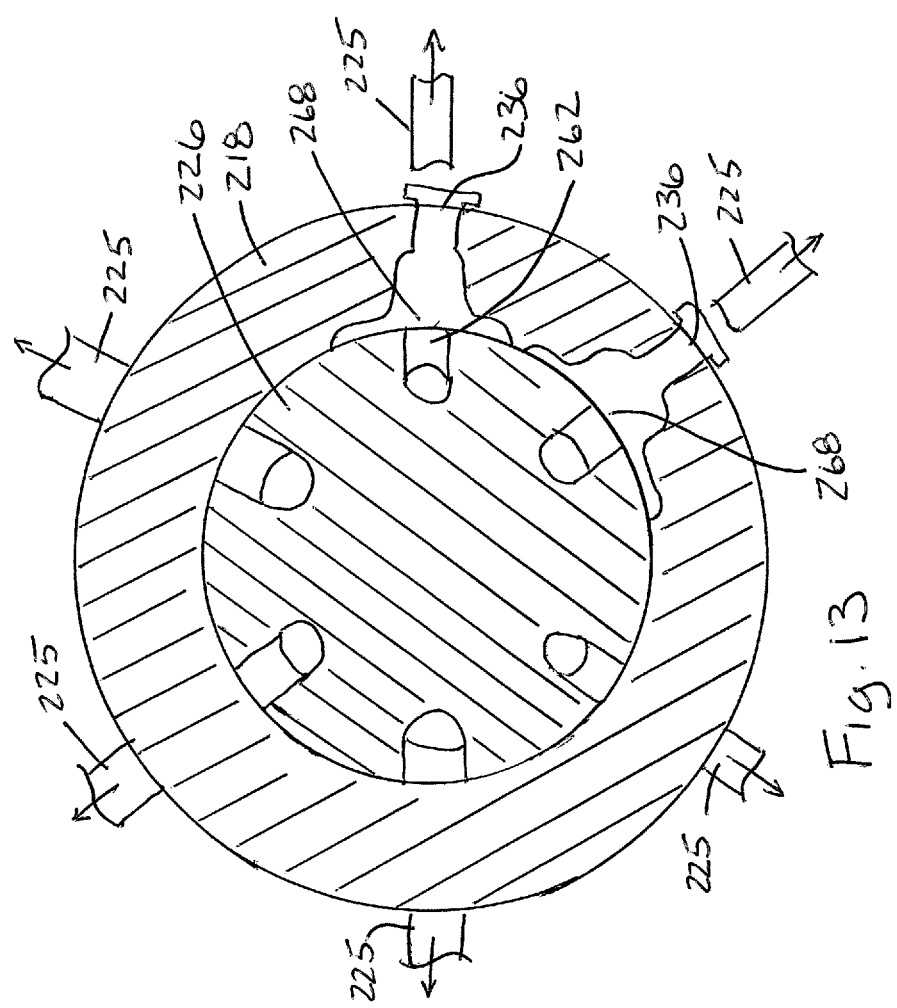

As another example, while the embodiments above contemplate the hub member as the rotatable part of the assembly, the reverse could be true. In this regard, reference is made to FIGS. 12 and 13 showing an assembly in which the hub member 218 is stationary and the hub insert 226 is rotated (e.g., via shaft 232). Here, the hub member includes two material inlet openings 236 that feed flowable material to two respective material transfer openings 268 and the hub insert 226 includes six material transfer openings 262 that move in and out of rotational alignment with openings 268 during hub insert rotation. Each material transfer opening 262 feeds material to a respective one of the feed outlets 238 at the bottom of the hub insert, with each feed outlet 238 connected to tubing/piping 225 that feed respective filling heads (not shown). Annular seal members 282 and 284 are also shown.

In other embodiments the hub insert could be moved in and out of the hub member through the bottom end of the hub member, and in such cases an annular shoulder on the hub insert could provide a bearing surface for part of the hub member.

In each of such embodiments and implementations, the rotary filling machine takes a bulk of a flowable product and automatically divides it into equal parts merely by rotation; passing it through the hub member and hub insert, operating as a volumetric filler. The rotary hub/insert turret is driven in lock-step with the positive displacement filler pump for accurate filling tolerances (i.e., hub rotation speed synced to pump speed, such as by the machine controller with servomotors driving bot the hub and the pump). The length of each of the material transfer openings in the stationary part of the hub member/hub insert combination should be exactly the same as the center-to-center spacing between the material transfer openings of the rotating part of the hub member/hub insert combination. For example, in the case of a rotating hub member with 6 transfer openings and corresponding outlet ports, the spacing is 360°/6=60°. In such case, all material transfer openings in the stationary hub insert should be exactly 60° in circumferential length with about a 1° separating web between adjacent transfer openings, creating a 121° circumferential fill zone range for an assembly in which the stationary hub insert includes two transfer openings. One long transfer opening in the stationary hub insert cannot transfer (divide) evenly if it sees multiple rotating hub openings for any extended period of time, so two full transfer openings of the rotor hub member should not be in a stator hub insert transfer opening at the same time, as such will causes erratic container fills.

As noted above the number of transfer openings can vary. For example, in the case of a rotating hub member with twelve transfer openings and corresponding outlet ports, the spacing is 360°/12=30°. If the stationary hub insert includes six transfer openings, the length of each transfer opening will be 30°, with five 1° webs between the openings, for a total circumferential fill zone range of 185° for the assembly. Such an embodiment results in long duration filling which equates to high capacity for only 12 filling stations.

Other variations and modifications are also possible.

What is claimed is:

1. A rotary filling machine, comprising:
   a hub member including a first end, a second end and an internal bore extending from the first end toward the second end, the internal bore defining an inner surface portion with a plurality of material transfer openings, each material transfer opening having a same shape and a same size;
   a hub insert having a first end and a second end, at least part of the hub insert disposed within the internal bore, wherein the part of the hub insert includes an external sidewall defining an outer surface portion that includes a plurality of material transfer openings, each material transfer opening of the hub insert having a same shape and a same size;
   wherein one of the hub member or the hub insert is rotatable and the other of the hub member or the hub insert is stationary;
   wherein the inner surface portion and the outer surface portion are in an axially aligned and mating relationship such that rotation of the one of the hub member or the hub insert causes a relative sequential movement in and out of fluid transfer alignment as between each of the material transfer openings of the hub member and each of the material transfer openings of the hub insert;
   a plurality of filling nozzles, wherein each material transfer opening of the one of the hub member or the hub insert feeds material to a respective one of the filling nozzles, wherein the filling nozzles rotate with the one of the hub member or hub insert;
   wherein:
      the material transfer openings of the one of the hub member or the hub insert are circumferentially spaced uniformly to provide a uniform center-to-center circumferential angular spacing between the material transfer openings; and
      a circumferential angular extent of each material transfer opening of the other of the hub member or the hub insert is set to match the center-to-center circumferential angular spacing of the material transfer openings of the one of the hub member or the hub insert.

2. The rotary filling machine of claim 1, wherein:
   (i) the outer surface portion is of right circular cylinder configuration and the inner surface portion is of right circular cylinder configuration.

3. The rotary filling machine of claim 1, wherein the material transfer openings of the hub member and the material transfer openings of the hub insert are collectively sized, positioned and shaped such that, during relative rotation between the hub member and the hub insert, a hub member material transfer opening total flow area that is aligned with the material transfer openings of the hub insert is always substantially the same.

4. The rotary filling machine of claim 1, wherein the hub insert is stationary and the hub member is rotatable.

5. The rotary filling machine of claim 4, wherein the first end of the hub member is an upper end and the internal bore extends downward, the hub insert sits within the internal bore and is supported by a shoulder on the hub member.

6. The rotary filling machine of claim 5, wherein a bearing arrangement is provided on the shoulder.

7. The rotary filling machine of claim 4, wherein the hub insert includes at least one material inlet opening and one or more passages for delivering flowable material from the at least one material inlet opening to the material transfer openings of the hub insert.

8. The rotary filling machine of claim 4, wherein:
   a first seal member is located between the inner surface portion and the outer surface portion at a location above a zone of alignment between the material transfer openings of the hub member and the material transfer openings of the hub insert, and
   a second seal member is located between the inner surface portion and the outer surface portion at a location below the zone of alignment.

9. The rotary filling machine of claim 8, wherein the first seal member seats at least partially within a first circumscribing recess on one of the inner surface portion or the outer surface portion and the second seal member seats at least partially within a second circumscribing recess on one of the inner surface portion or the outer surface portion.

10. The rotary filling machine of claim 1, wherein the hub member is stationary and the hub insert is rotatable, and the internal bore defines a shoulder that supports the hub member on the hub insert.

11. The rotary filling machine of claim 10, wherein the hub member includes at least one material inlet opening and one or more passages for delivering flowable material from the at least one material inlet opening to the material transfer openings of the hub member.

12. The rotary filling machine of claim 11, wherein:
   a first seal member is located between the inner surface portion and the outer surface portion at a location above a zone of alignment between the material transfer openings of the hub member and the material transfer openings of the hub insert, and
   a second seal member is located between the inner surface portion and the outer surface portion at a location below the zone of alignment.

13. The rotary filling machine of claim 1, further comprising:

a container transport system that moves containers synchronously with the filling nozzles.

14. The rotary filling machine of claim 13, wherein the container transport system includes a plurality of container supports that raise and lower the containers relative to the filling nozzles during filling operations to achieve a bottom up fill of the containers.

15. A rotary filling machine, comprising:
a hub member including an internal bore defining an inner surface portion with a plurality of material transfer openings, each material transfer opening having a same shape and a same size;
a hub insert including a portion disposed within the internal bore, wherein the portion includes an outer surface portion that includes a plurality of material transfer openings, each material transfer opening of the hub insert having a same shape and a same size;
wherein one of the hub member or the hub insert is rotatable and the other of the hub member or the hub insert is stationary;
wherein the inner surface portion and the outer surface portion are in an axially aligned and mating relationship for bringing the material transfer openings of the hub member in and out of flow communication with the material transfer openings of the hub insert during rotation of the one of the hub member or the hub insert;
a plurality of filling nozzles, wherein each material transfer opening of the one of the hub member or the hub insert feeds material to a respective one of the filling nozzles, and wherein the filling nozzles rotate with the one of the hub member or hub insert;
wherein the outer surface portion is of right circular cylinder configuration and the inner surface portion is of right circular cylinder configuration;
wherein:
the material transfer openings of the one of the hub member or the hub insert are circumferentially spaced uniformly to provide a uniform center-to-center circumferential angular spacing between the material transfer openings; and
a circumferential angular extent of each material transfer opening of the other of the hub member or the hub insert is set to match the center-to-center circumferential angular spacing of the material transfer openings of the one of the hub member or the hub insert.

16. A rotary filling machine, comprising:
a hub member including a first end a second end and an internal bore extending from the first end toward the second end, the internal bore defining an inner surface portion with a plurality of material transfer openings, each material transfer opening having a same shape and a same size;
a hub insert having a first end and a second end, at least part of the hub insert disposed within the internal bore, wherein the part of the hub insert includes an external sidewall defining an outer surface portion that includes a plurality of material transfer openings, each material transfer opening having same shape and a same size;
wherein the hub member is rotatable and the hub insert is stationary;
wherein the inner surface portion and the outer surface portion are in an axially aligned and mating relationship such that rotation of the hub member causes a relative sequential movement in and out of fluid transfer alignment as between each of the material transfer opening of the hub member and the material transfer openings of the hub insert;
a plurality of filling heads, wherein each material transfer opening of the hub member feeds material to a respective one of the filling heads that rotates with the hub member;
wherein the outer surface portion is of right circular cylinder configuration and the inner surface portion is of right circular cylinder configuration;
wherein:
the material transfer openings of the hub member are circumferentially spaced uniformly to provide a uniform center-to-center circumferential angular spacing between the material transfer openings; and
a circumferential angular extent of each material transfer opening of the hub insert is set to match the center-to-center circumferential angular spacing of the material transfer openings of the hub member.

17. The rotary filling machine of claim 16, wherein each material transfer opening of the hub insert is at all times aligned with a same total flow area of the material transfer openings of the hub member, regardless of whether the same total flow area is made up of a single material transfer opening of the hub member or parts of a plurality of material transfer openings of the hub member.

18. The rotary filling machine of claim 17, wherein the same total flow area matches a flow area of a single material transfer opening of the hub member.

* * * * *